United States Patent
Medina Perilla et al.

(10) Patent No.: US 9,441,157 B2
(45) Date of Patent: Sep. 13, 2016

(54) OXYGEN-ABSORBING COMPOUND ENCAPSULATED IN A SILICA MATRIX AND METHOD FOR THE PRODUCTION THEREOF

(75) Inventors: Jorge Alberto Medina Perilla, Bogota (CO); Angela Maria Garcia Mora, Bogota (CO); Andrea Marcela Arias Herrera, Bogota (CO); Ronald Vicente Joven Pineda, Bogota (CO)

(73) Assignee: UNIVERSIDAD DE LOS ANDES, Bogota (CO)

( * ) Notice: Subject to any disclaimer, the term of this patent is extended or adjusted under 35 U.S.C. 154(b) by 255 days.

(21) Appl. No.: 13/816,913

(22) PCT Filed: Mar. 18, 2011

(86) PCT No.: PCT/IB2011/000584
§ 371 (c)(1),
(2), (4) Date: May 6, 2013

(87) PCT Pub. No.: WO2012/020287
PCT Pub. Date: Feb. 16, 2012

(65) Prior Publication Data
US 2013/0207042 A1    Aug. 15, 2013

(30) Foreign Application Priority Data
Aug. 13, 2010  (CO) .................................. 10100060

(51) Int. Cl.
*C09K 15/02* (2006.01)
*C09K 15/06* (2006.01)
(Continued)

(52) U.S. Cl.
CPC .............. *C09K 15/02* (2013.01); *A23L 3/3436* (2013.01); *B01J 13/0056* (2013.01);
(Continued)

(58) Field of Classification Search
CPC .............. A23L 3/3436; B01J 13/0056; B01J 20/3293; B01J 2220/42; B01J 2220/66; B01J 20/0229; B01J 20/0237; B01J 20/28026; B01J 20/22; B01J 20/223; B01J 20/3021; B01J 20/3085; B01J 20/2805; C09K 15/06; C09K 15/02
See application file for complete search history.

(56) References Cited

U.S. PATENT DOCUMENTS

| | | | |
|---|---|---|---|
| 4,524,015 A | 6/1985 | Takahashi et al. | |
| 5,128,060 A * | 7/1992 | Ueno | A23L 3/3436 252/184 |

(Continued)

FOREIGN PATENT DOCUMENTS

| | | |
|---|---|---|
| EP | 0457457 A2 | 11/1991 |
| EP | 1550506 A1 | 7/2005 |

OTHER PUBLICATIONS

International Search Report, WO2012/020287, mailed Sep. 29, 2011, 8 pages.

*Primary Examiner* — Joseph D Anthony
(74) *Attorney, Agent, or Firm* — The Juhasz Law Firm (57) ABSTRACT

This disclosure refers to the fabrication of an active oxygen-absorbing compound composed of a sodium erythorbate and a non-organic salt of a transition metal encapsulated through the sol-gel method in a silica matrix. This compound can be part of the package's structure for oxidation-sensitive products or contained in the surrounding atmosphere to decrease the oxygen concentration. This application describes the method for the fabrication of the oxygen-absorber, as well as its encapsulation and incorporation in polymeric matrixes.

14 Claims, 3 Drawing Sheets

(51) Int. Cl.
*A23L 3/3436* (2006.01)
*B01J 13/00* (2006.01)
*B01J 13/02* (2006.01)
*B01J 20/02* (2006.01)
*B01J 20/32* (2006.01)
*B01J 20/28* (2006.01)
*B01J 20/22* (2006.01)
*B01J 20/30* (2006.01)

(52) U.S. Cl.
CPC ....... *B01J 20/0229* (2013.01); *B01J 20/0237* (2013.01); *B01J 20/22* (2013.01); *B01J 20/223* (2013.01); *B01J 20/2805* (2013.01); *B01J 20/28026* (2013.01); *B01J 20/3021* (2013.01); *B01J 20/3085* (2013.01); *B01J 20/3293* (2013.01); *C09K 15/06* (2013.01); *B01J 2220/42* (2013.01); *B01J 2220/66* (2013.01)

(56) References Cited

U.S. PATENT DOCUMENTS

| | | | |
|---|---|---|---|
| 5,143,763 | A | 9/1992 | Yamada et al. |
| 5,196,382 | A * | 3/1993 | Hench ............... C03C 1/006 252/582 |
| 5,200,334 | A | 4/1993 | Dunn et al. |
| 5,236,617 | A * | 8/1993 | Ueno ................ A23L 3/3436 252/184 |
| 5,364,555 | A | 11/1994 | Zenner et al. |
| 5,928,560 | A | 7/1999 | DelDuca et al. |
| 5,977,212 | A | 11/1999 | Ebner et al. |
| 6,458,438 | B2 | 10/2002 | Blinka et al. |
| 6,465,065 | B1 | 10/2002 | Teumac et al. |
| 6,495,352 | B1 | 12/2002 | Brinker et al. |
| 6,656,383 | B1 | 12/2003 | Zenner et al. |
| 6,767,483 | B2 | 7/2004 | Stowell et al. |
| 2006/0163534 | A1* | 7/2006 | Sugimoto ........... A23L 3/3436 252/188.28 |
| 2008/0096047 | A1* | 4/2008 | Yamane ............. A23L 3/3436 428/702 |
| 2013/0207042 | A1* | 8/2013 | Joven Pineda ...... A23L 3/3436 252/400.3 |

* cited by examiner

OXYGEN-ABSORBING COMPOUND ENCAPSULATED IN A SILICA MATRIX AND METHOD FOR THE PRODUCTION THEREOF

CLAIM TO PRIORITY

The present application is a continuation of, and claims the benefit of, PCT/IB2011/000584 (PCT published application WO2012/020287 A1), filed Mar. 18, 2011, which claims the benefit of Colombian Appl. 10100060, filed Aug. 13, 2010, both of which are hereby incorporated by reference in their entirety.

FIELD OF THE DISCLOSURE

This disclosure refers to an oxygen-absorbing compound and the method for its production. The compound contains an encapsulation matrix and an oxygen-absorbing compound that holds a sodium erythorbate and a non-organic salt of a transition metal. The encapsulation matrix is prepared by the sol-gel method. This oxygen-absorbing compound can be used in the production of packaging of oxidation-sensitive goods.

BACKGROUND OF THE DISCLOSURE

In the state of the art there are various known compounds used to inhibit the degradation of packaged substances caused by the oxidation reactions triggered by the oxygen located at the head space of the packages or that permeate through the packaging material. These types of substances are usually called oxygen absorbers or sweepers.

Various sweeper oxygen absorber compounds have been developed, including organic and non-organic variations, which, in some case, need to be in the presence of a catalyst or a substance that triggers the absorption reaction.

Among the non-organic compounds, there are substances made out of iron, for example metal salts and dust. These substances are mentioned in the U.S. Pat. Nos. 5,143,763 and 5,928,560. The traditional use of these compounds is developed by inserting them in little air-permeable envelopes ("sachets") inside of the packaging of dry products, preventing direct contact between the compounds and the packed product. This form of use carries the risk of contaminating the product due to the possible breaking of the envelopes or even its ingestion.

These problems, even for the liquid or moisturizing products, could be solved by soaking the compounds inside the wall of the package, when it is possible to react to the oxygen that filters through the walls. This solution is not possible for these non-organic compounds and, nonetheless, it has represented a possible idea regarding organic compounds.

The organic substances that fulfill the oxygen absorption role, like ascorbic acid, ascorbates, isoascorbates, ascorbyl palm itate, salicylic acid and their derivative substances, need to be in contact with a salt to form compounds that trigger an oxygen absorption, in which the salt generally comes from a transition metal. Details and examples of these absorbing substances can be found in the U.S. Pat. Nos. 4,524,015, 6,465,065, 6,274,210 and 6,656,383.

There are patents that have claimed oxygen-sweeping organic compounds, with or without catalysts, incorporated in polymer matrixes, like the U.S. Pat. No. 5,364,555 and the Japanese patent applications 61-238,836 and 54-022,281. Nonetheless, these organic compounds have two conditions that need to be taken into account. On the one hand, by reactions directly or indirectly with oxygen and by its own nature, they would cause reaction products that could affect the package's structure that could also disturb the packed product itself, diminishing its quality. On the other hand, for assuring and improving its efficiency they have to be protected from the effects caused by temperature or UV radiation.

For example, the degradation of ascorbic acid and its derivatives caused by its reactions to oxygen, temperature and UV radiation have been widely studied, and it can produce unpleasant colors and smells (Commission of the European Communities, 2001) (Giorgia Spigno, 1999) (Jeane Santos de Rosa, 2007) (Kurata & Sakurai, 1967) (Pascault, Sautereau, Verdu & Williams, 2002) (Santos, 2008).

In U.S. Pat. No. 5,364,555, the claim regards an oxygen-sweeping compound that contains salicylic acid chelate or a compound made of the same transition metal or a metal salt, which can be incorporated into a polymeric matrix as PVC. Nonetheless, nor the method by which the oxygen sweeper is incorporated into the matrix or the way in which the product of the reaction between salicylic acid and oxygen is prevented from reaching the packed product are specified. In fact, the formulation that was revealed refers to the manufacturing of liners that adhere to the lids or the seal of the products instead of sticking to the packages that hold the oxygen absorber.

Japanese application 61-238,836 shows a film for structures of packaging made from a thermoplastic material such as low-density polyethylene ("LDPE"), that includes ascorbic acid by itself or combined with aliphatic polycarboxylic acids. Although the fact that the film shows good properties regarding gas barriers is clearly stated, the application does not show the method by which the ascorbic acid is protected from a premature degradation in the making of the film or the way in which the products of the oxidation of the acid is prevented from reaching the packaging or the product itself.

In the same way, the Japanese application 54-022,281 displays a fruit tray made out of thermoplastic foam a thin layer of ascorbic acid or erythorbic acid (or any of its alkaline salts), put over the tray's slots. Regardless, there are some doubts involving the products of the oxidation of these compounds and how to manage for them not to reach the packed fruit.

U.S. Pat. No. 5,977,212 claims a composition in which the sweepers are contained in an inert-porous matrix that could hold the reaction's products and protect it from thermal effects during the process developed with the polymer matrix. However, this patent does not state the method in order to get said results, nor it specifies the effect the effect that the matrix has on the oxygen absorption kinetics. The same happens in U.S. Pat. No. 6,458,438, where the claim consists of a polymeric film that holds the oxygen absorber within a zeolite matrix.

The sol-gel method has been used for other purposes besides packaging, for example, for the encapsulation of active biological material and substances like lipids, membranes, proteins, enzymes, inks and carotenoid in porous materials like silicon dioxide or zeolites. This type of encapsulation has been divulged by the U.S. Pat. Nos. 5,200,334, 6,767,483 and 6,495,352, and also by the following documents:

M. Mureseanu, A New Mesoporous Micelle-Templated Silica Route for Enzyme Encapsulation, 34296 Montpellier Cedex 5, France, 2005.

J. W. Gilliland, Solvent Effect on Mobility and Photostability of Organic Dyes Embedded inside Silica Sol Gel Thin Films, University of Oklahoma, Norman, Okla. 73019, 2005.

Z. He, Carotenoids in Sol Gels: Incorporation, Stability, and Sensitivity to Oxidant and Acid, Tuscaloosa, Ala. 35487-0336, 2000.

M. Saenz, Estudio de las Variables de Reaccióen Sintesis de Silica Gel absorbente, Revista de Ingenierie e Investigación, Vol. 27 No. 2, August 2007.

Nonetheless, there is no known application that involves the sol-gel reaction and the oxygen sweepers for its incorporation in packaging technology in the prior state of the art.

SUMMARY OF THE DISCLOSURE

One embodiment of the disclosure is an oxygen-absorbing compound that is useful to protect packed oxidation-sensitive products. The compound includes an oxygen-absorbing compound selected from erythorbic acid and a salt of erythorbic acid, a catalyst based on a non-organic salt of a transition metal, and a hydrated silica gel with molecular formula $SiO_2 xH_2O$.

Another embodiment includes a method of preparing an oxygen-absorbing compound. The method includes preparing a mixture of an oxygen-absorbing substance and a catalyst from a non-organic salt of a transition metal in relation between 0.01 and 5 grams of an aqueous suspension of the oxygen-absorbing substance and the catalyst, with a concentration between 67 and 133 g/liter of suspension. The method also includes neutralizing the hydrochloric acid with concentration between 1.55 and 3.00 molar and with a pH below 1, an amount of sodium silicate between 22 and 56 grams per liter of chlorhydric acid solution, and with a concentration between 40 and 560 grams per liter of solution, through maximum agitation of 100 Hz (6000 rpm). The method then includes adding the suspension or the mixture and continuing to add sodium silicate in a relation of 10 to 40 grams of sodium silicate solution per liter of hydrochloric acid solution. Later, leave the obtained gel resting for a time between 1 and 48 hours, clean the gel with water in order to remove the salts that result from the neutralization reaction, using a funnel with a filter paper and using vacuum. The resulting product in then dried at a temperatures between 333.15° K and 363.15° K and at atmospheric pressure or using vacuum. Then, to activate the compound, put the oxygen-absorbing compound of non-organic nature in a temperature between 298.15° K and 353.15° K, in a relative humidity between 50% and 99% or with actinic radiation.

TABLE 1

Orthogonal Arrangement L4 for the design of experiments characterized by parallel-plate rheometer.

| Experiment # | Particle Size | % in weight of Sodium Erythorbate | Angular Speed of Mixing |
|---|---|---|---|
| 1 | <25 micrometers | 5 | 50 rpm |
| 2 | <25 micrometers | 10 | 30 rpm |
| 3 | Between 90 and 180 micrometers | 5 | 30 rpm |
| 4 | Between 90 and 180 micrometers | 10 | 50 rpm |

DETAILED DESCRIPTION OF THE DISCLOSURE

Even though there have been attempts to reach solutions to the technical problem stated in this disclosure, which is to provide new oxygen-absorbing compositions that can prevent the possible degradation of the organic oxygen-sweeping compounds during the process and the possible migration of the reaction's products, there is no known oxygen-absorbing composition in which the absorbing compound is encapsulated in a silica matrix by the sol-gel method, that are able to hold the products of the oxidation reaction and protect the oxygen-absorbing compound from premature degradation during the manufacturing process of the packaging of oxidation-sensitive products.

Specifically, it's relevant to mention that none of the prior state of the art examples report experimental results that proof the effect that encapsulating the oxygen-absorbing compound in an inert matrix in the kinetic of oxygen absorption or even show or suggest the method by which this compositions are obtained. On the other hand, this application specifies the absorption capacity of oxygen in the sweeping compound and the method to obtain it. So the effectiveness of this has been demonstrated, as it will be evidenced by the latter examples Taking into account the problems that have been spotted in the current state of the art, this application provides an oxygen-scavenger compound and the method for its manufacturing, that can be exposed to the work temperatures of the polymers used for the packaging structures without prematurely degrading, that inhibits the migration of unwanted compounds inside the package's structure or the packed product and that maintains the appropriate oxygen-absorption kinetics for the conservation through time of the oxygen-sensible products.

This composition can be used in packaging structures that protect products that tend to oxidize, like juice, cheese, meat products, coffee and pharmaceuticals, among other perishable products. This innovative composition can be used in the following ways:

i. Dispersed and distributed in a polymeric layer of the package's structure.

ii. Distributed and dispersed in a label or polymeric patch inside the bottling or inside its lid.

iii. Contained in a porous envelope located in double-bottom bottles o in a cell that is located inside the container's lid, by direct contact with the product that will be packed. This application is restricted to dry products.

Specifically, this disclosure provides a composition that contains:

An oxygen-absorbing compound

A catalyst from an inorganic salt from a transition metal

A silica porous matrix prepared by a sol-gel reaction, where the prior components are encapsulated.

The porous matrix and the encapsulation method claimed through this application have proved to be an effective protection against the degradation suffered by sodium erythorbate when reaching temperatures above 150° C., improving its processing capacity at least up to 250° C.

This disclosure embodies a ground breaking formulation by which an oxygen-absorbing compound of sodium erythorbate and a catalyst that comes from the salt of a transition metal are encapsulated in a silica porous matrix. Some of the advantages that this disclosure offers regarding the prior state of the art are: the possibility to incorporate the oxygen-absorbing compound in a polymeric layer in the packaging structure, the protection of the oxygen-absorbing compound against thermic degradation during the production of the packages, the capacity to control the action kinetics of the oxygen-absorbing compound and the retention of some volatile products generated during its action.

This disclosure refers to a composition that contains: an oxygen-absorbing compound, a catalyst based on a non-organic salt of a transition metal and a porous silica matrix prepared by a sol-gel reaction.

Description of the Oxygen-Absorbing Substance

The oxygen-absorbing substance is a sodium erythorbate named IUPAC, sodium 5-[(1S)-1,2-dyhyroxietil]-3-hydroxy-4-oxo-furan-2-oleato with actual CAS number 89-65-6.

Description of the Catalyst Based on a Non-organic Salt of a Transition Metal

Along with the oxygen-absorbing compound, a non-organic salt from a transition metal is used. It acts as a catalyst of the absorption reaction. This catalyst is a non-organic salt of a transition metal that may be, but is not limited to, a copper chloride (1), a ferrous sulfate or a combination of both. For a proper catalytic action, the non-organic salt of the transition metal should be in a relation between 39% and 200% w/w with respect to the oxygen-absorbing substance. Evidence of the catalyst effect is illustrated in example 6 of this application.

Description of the Silica Porous Matrix

The oxygen-absorbing substance and the catalyst are encapsulated in a porous silica matrix. The encapsulation in this matrix provides the following advantages: the possibility to incorporate the oxygen-absorbing compound in a polymeric layer in the packaging structure, the protection of the oxygen-absorbing compound against thermic degradation during the production of the packages, the capacity to control the action kinetics of the oxygen-absorbing compound and the retention of some volatile products generated during its action.

Description of the Method for Preparing the Active Oxygen-Absorbing Compound

The method to prepare the active oxygen-absorbing compound involves the following steps:

i. Encapsulating the oxygen-absorbing compound and the catalyst based on a non-organic salt of a transition metal inside a silica gel hydrated through the sol-gel reaction.

ii. Activating the oxygen-absorbing compound of organic nature obtained in the first step, putting it though humidity action, temperature, actinic radiation or a combination of these. The temperature may be between 298.15° K and 353.15° K, the relative humidity between 50% and 99% and the activation time can fluctuate between 1800 and 7200 seconds.

The method to encapsulate the oxygen-absorbing compound and the catalyst includes the steps described as follows:

a. In a temperature between 283.15K and 323K (it would be preferable for it to be between 283.15 K and 298.15K), prepare a powdered mixture of the oxygen-absorbing substance and the catalyst, in relation between 0.01 and 5 grams (it would be preferable for it to be between 0.39 and 2 grams), or otherwise an aqueous suspension of the oxygen-absorbing substance and the catalyst, with a concentration between 67 kg/m$^3$ and 133 kg/m$^3$.

b. In a temperature between 283.15K and 323K (it would be preferable for it be between 283.15 and 298.15K), through continuous agitation add hydrochloric acid with a concentration between 1M and 5M (it would be preferable for it to be between 1.55M and 3.00M) and with a pH below 1, an amount of sodium silicate that oscillates between 22 kg and 56 kg per cubic meter of hydrochloric acid solution, that shows a concentration that fluctuates between 40 kg/m$^3$ and 560 kg/m$^3$, through maximum agitation of 100 Hz (6000 RPH) and maximum pH of 2.

c. The prepared suspension is added and Sodium Silicate is continuously added in a relation of 10 to 40 kg of Sodium Silicate solution for every cubic meter of hydrochloric acid solution.

d. The obtained gel is left to rest for a time between 1 and 48 hours at a temperature between 283.15K and 323K.

e. Once the rest time has elapsed, the gel is washed with water in order to remove the salt produced by the neutralizing reaction, using vacuum between 600 and 6000 Pa (it would be preferable for it be between 600 and 2000 Pa).

f. After the cleaning, the gel dries at a temperature between 333.15° K and 363.15° K at atmospheric pressure or at vacuum.

Description of the Method to Incorporate the Oxygen-Absorbing Compound in the Polymeric Matrix The method to incorporate the oxygen-absorbing compound in the polymeric matrix includes the following steps:

a) Put the oxygen-absorbing compound through size diminution and homogenization operations, until it reaches less than 180 micrometers.

B) Incorporate the compound in the polymeric compound in a rate of 5% to 10% in weight regarding the polymer, through an variable angular velocity mixer that can function between 0 and 1.67 Hz (0 and 100 RPM), with a melting viscosity that is between $10^3$-$10^6$ Pa·s.

Size diminution is developed through a grinding process. Additionally, the homogenization of size is done through sieving operations using net seizes equal or inferior to 180 micrometers.

EXAMPLES

This disclosure is fully enabled and can be followed by a person with skill in the art, taking into account his knowledge and in accordance to the examples as follows.

The following examples illustrate this invention. Nonetheless, these examples are not limiting, taking into account the knowledge a person with skill in the art.

Example 1

Specifications of Sodium Silicate

For the production of the oxygen-absorbing compound, sodium silicate is used as shown in Table 2.

TABLE 2

Specifics of sodium silicate.

| Parameter | Value |
|---|---|
| Density, Bé degrees at 293.15° K (20° C.) | 50 +/− 1 |
| Specific Garvity | 1.48 a 1.5 |
| Alkalinity (% $Na_2O$) | 12.5 +/− 1 |
| Silica (% $SiO_2$) | 31.20 to 33.15 |
| Ratio $Na_2O:SiO_2$ | 1:2.10 to 1:2.40 |
| Viscosity | 600 to 850 centipoise |
| pH | 12 +/− 0.5 |

Example 2

Illustration of the Procedure for the Preparation of the Active Oxygen—Absorbing Compound The preparation of the gel starts with 250 ml of a solution made out of hydrochloric acid in water with a concentration of 1.55 Molar and a PH below 1, that is titrated by continuous agitation, for example, in an Ultra-Turraz agitator at 5000 rpm, with an aqueous solution of sodium silicate in water. The aqueous solution of Sodium Silicate is prepared in a concentration of 560 g of sodium silicate per liter of solution. The solution of sodium silicate is slowly added until it reaches a pH of 2, moment in which the powder of the oxygen-absorbing substance and the catalyst are added in the proportions that are illustrated in Table 3. The addition of the aqueous solution of silicate must continue until the gel is obtained, which usually happens when pH levels between 5 and 7 are reached.

TABLE 3

Formulation used in the preparation of the active oxygen-absorbing compound

| Substance | Amount (g) |
|---|---|
| Erythorbate | 20.0 |
| Heptahydrated Iron Sulfate | 140.3 |
| Sodium Silicate (560 g per liter) | 140.0 |
| Final product after drying | 32.5 |

Once the gel is obtained, it is left to age in ambient conditions for 18 hours and then washed with distilled water, in order to eliminate the salt produced by the neutralization reaction. Then the drying under atmospheric pressure and a temperature of 60° C. takes place until a change in weight of less than 1% is obtained. The gel then is pulverized with alumina balls with a relation of 1:10 in weight (dry product: alumina balls), until a particle of less than 63 micrometers is obtained.

Example 3

Illustration of the Capacity of Absorption of the Active Oxygen-Absorber

To prove the absorption capacity of the active oxygen-absorbing compound with the formulation described in example 2, various bags of aluminum film with a volume of 48 ml were sealed and the concentration of oxygen in function of the time was evaluated using a Quantek oxygen meter. The results of the oxygen measuring in function of the time for the active oxygen-absorbing compound are presented in FIG. 1 in the next conditions: 1.5230 g+/−0.0016 g sodium erythorbate and heptahydrated iron sulfate in a silica matrix, temperature 13° C., pressure 560 mm Hg.

Figure 1:
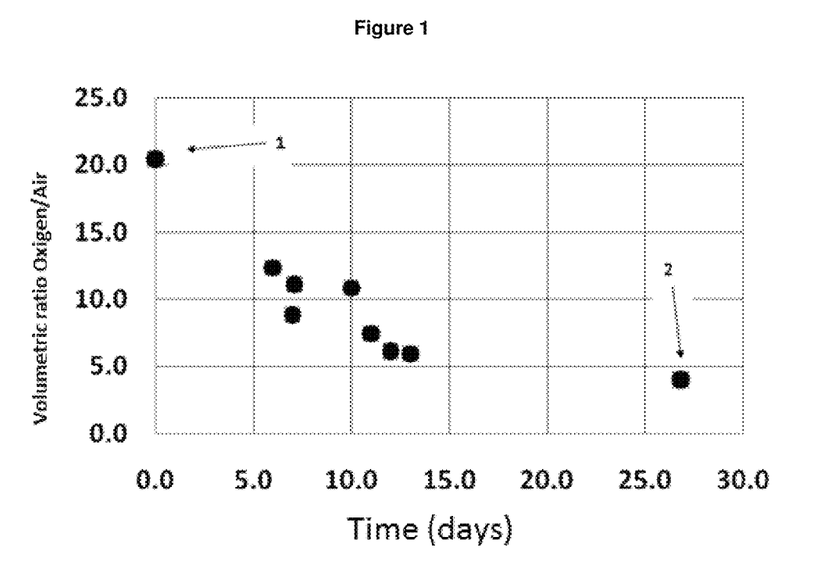
FIG. 1 shows the results of the molar percentage of oxygen (oxygen mol/100 air mol) in function of the time for the prepared oxygen-absorbing compound, displaying with (1) the initial value in time 0, in other words, in the instant when the sample was packed, that stands for the percentage of oxygen in the environment, and with (2) the value of oxygen absorption 27 days later.

FIG. 1 depicts how the active oxygen-absorbing compound is able to lower the percentage of oxygen inside the bag of aluminum film from 21% up to 4% (molar percentage) in 27 days.

Example 4

Illustration of Kinetics of Oxygen Absorption that can be Found for a Specific Formulation The recollected data regarding the oxygen consumption of an oxygen absorber made out of sodium erythorbate and iron sulfate contained in a silica matrix made through a sol-gel reaction were analyzed through kinetic models of different types, and the best adjustment was achieved in a kinetic of 1.84. Being so, the oxygen absorption can be evaluated as follows:

$$\frac{dC}{dt} = kC^{1.84}$$

where C(t) is the oxygen concentration (%) in time established in days (t) and k is the kinetic constant, in this case k=0.0092.

$$\frac{\%}{dia \, \%^{1.84}}.$$

Example 5

Illustration of the Incorporation of an Oxygen-Absorbing Compound in a Polymer Such as LDPE In a Brabender Plasticoder internal mixer the low density polyethylene DOW722 and the sodium erythorbate with particle size between 90 to 180 micrometers and 0.83 Hz were incorporated in a relation of 10% weight of erythorbate/total weight of the sample with temperature of 160° C. during 5 minutes.

Figure 2:
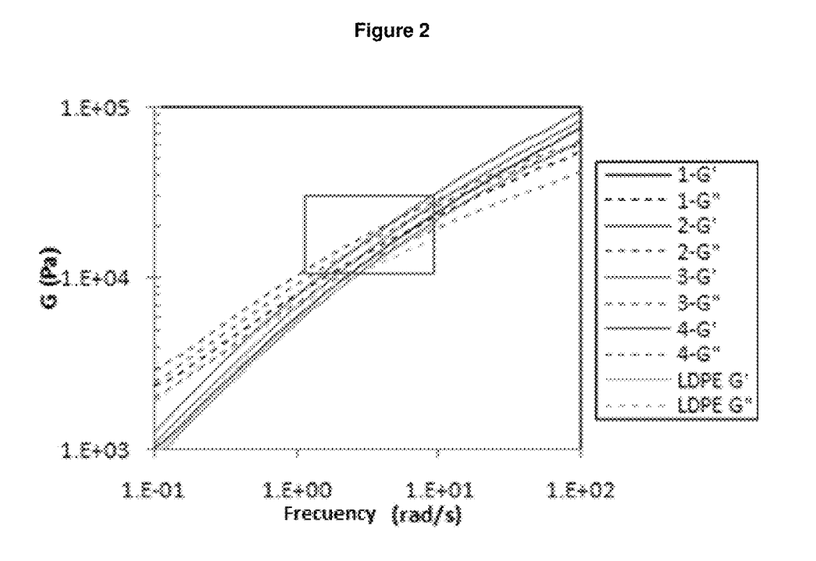
FIG. 2 shows the characterization by frequency sweeping in a rheometer of parallel plates of sodium erythorbate and low-density polyethylene, where G'=Shear storage module (continuous lines) and G"=Shear loss module (dotted lines). This figure presents the cutting point of both modules compared with pure polyethylene. The experimental conditions of the mixtures are presented in Table 1 (below).

FIG. 2 shows the related characterization in a parallel-plate rheometer, where G'=Shear storage module and G"=Shear loss module. As it can be acknowledged, the sodium erythorbate increases the value of the modules, developing its intercrossing at higher deformation rates. The deformation rate at which the intercrossing takes place is independent from the particle's size and the weight percentage of the active agent when mixed with low-density polyethylene.

Example 6

Illustration of the Capacity of Absorption of the Active Oxygen-absorbing Compound after a Specific Activation Protocol The behaviors of the absorption of oxygen from a mixture of sodium erythorbate and heptahydrated iron sulfate in a mass relation erythorbate/iron sulfate (p/p)=0.39 activated in conditions of 90% HR (relative humidity), during 30 minutes and encapsulated in silica gel.

To try out the absorption capacity of the compound with the described formula, various aluminum film bags were sealed with a volume of 96 ml and the oxygen concentration in function of the time was evaluated using a Quantek oxygen meter. The oxygen measuring results ($cm^3$ of oxygen/100 $cm^3$ of air) in function of the time for the active oxygen-absorbing compound are represented in FIG. 3 in the following conditions: 0.8057 g+/−0.0018 g of a mixture 0.39 g/g of sodium erythorbate and heptahydrated iron sulfate in a silica matrix, temperature 13° C., pressure 560 mm Hg.

Figure 3:
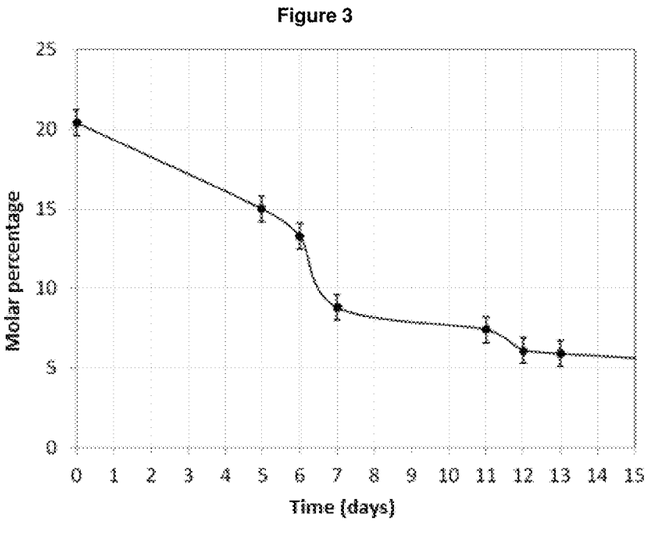
FIG. 3 shows the results from the oxygen measure (moles of oxygen/100 moles of air) in function of the time for the active oxygen-absorbing compound.

FIG. 3 shows that the humidity protocol effectively activated the oxygen absorption property, from a molar percentage of 21% and lowering in 15 days the packed amount to around 5%.

Example 7

Decrease of the Molar Percentage (Moles of $O_2$/Moles of Air of Oxygen with the Time in a 48 $cm^3$ of Air in Contact with Different Formulations of the Claimed Composition Table 4 shows two key factors. First, the presence of metallic salts for the oxygen absorption to occur (samples 1 to 3 in comparison with samples 4 and 5). Second, the fact that encapsulation delays the capacity of oxygen absorption in time, being that samples 4 and 5 decrease the oxygen percentage faster than samples 6 and 7.

TABLE 5

Molar percentage of oxygen during 5 days of a sample of 48 cm3 of air in contact with different formulations of oxygen-sweepers

| Number of Sample | Sample | erythorbate/catalyst w/w ratio | % of Erythorbate in composition (w/w) | Day 0 | Day 1 | Day 2 | Day 3 | Day 4 | Day 5 |
|---|---|---|---|---|---|---|---|---|---|
| 1 | Sodium Erythorbate | NA | NA | 20.4 | 20.0 | 20.0 | 20.0 | 20.0 | 20.0 |
| 2 | Cuprous Chloride | NA | NA | 20.4 | 20.0 | 20.0 | 20.0 | 20.0 | 20.0 |
| 3 | Ferrous Sulfate | NA | NA | 20.4 | 20.2 | 20.0 | 20.0 | 20.0 | 19.8 |
| 4 | Sodium Erythorbate/ Ferrous Sulfate | 39/61 | 50 | 20.4 | 16.0 | 12.0 | 9.5 | 7.5 | 6.0 |
| 5 | Sodium Erythorbate/ Cuprous Chloride | 39/61 | 50 | 20.4 | 13.0 | 8.0 | 5.0 | 2.0 | 1.0 |
| 6 | Sodium Erythorbate/ Ferrous Sulfate encapsulated in silicagel | 39/61 | 50 | 20.4 | 19.5 | 18.0 | 16.5 | 15.0 | 13.5 |
| 7 | Sodium Erythorbate/ Cuprous Chloride encapsulated in silica gel | 39/61 | 50 | 20.4 | 20.0 | 20.0 | 20.0 | 19.5 | 19.5 |

NA Not applicable

Example 8

Comparison of the Patented Technology with Example 2 from U.S. Pat. No. 5,977,212

In the U.S. Pat. No. 5,977,212, a mixture in a nitrogen atmosphere is done for an oxygen-scavenger based on ascorbates. As a result, U.S. Pat. No. 5,977,212 presents the capacity of oxygen absorption of the obtained mixtures. On the last row of Table 5 the results for sample 6 of Example 7 were presented and they outweigh the products evidenced in U.S. Pat. No. 5,977,212 in all the cases.

TABLE 5

Comparison of the patented technology with Example 2 of U.S. Pat. No. 5,977,212.

| Sample Number | Silica Sample | Absorption capacity of the mixture obtained in day 1 ($mgO_2$/200 mg/d) | Absorption capacity of the mixture obtained in day 7 ($mgO_2$/200 mg/d) | Absorption capacity of the mixture obtained in 2 weeks ($mgO_2$/200 mg/d) |
|---|---|---|---|---|
| 9 | Control[1] | 0 | 0.1 ± 0.1 | 0.2 ± 0.1 |
| 10 | 1 | 0.92 ± 0.02 | 1.7 ± 0.2 | 2.4 ± 0.3 |

TABLE 5-continued

Comparison of the patented technology with
Example 2 of U.S. Pat. No. 5,977,212.

| Sample Number | Silica Sample | Absorption capacity of the mixture obtained in day 1 (mgO₂/200 mg/d) | Absorption capacity of the mixture obtained in day 7 (mgO₂/200 mg/d) | Absorption capacity of the mixture obtained in 2 weeks (mgO₂/200 mg/d) |
|---|---|---|---|---|
| 11 | 1A | — | 0.4 ± .002 | 0.64 ± 0.7 |
| 12 | 2 | 1.24 ± 0.01 | 2.9 ± 0.3 | 4.6 ± 0.3 |
| 13 | 3 | 1.2 ± 0.01 | 3.2 ± 0.1 | 4.7 ± 0.3 |
| 14 | 4 | 1.69 ± 0.05 | 2.5 ± 0.4 | 3.3 ± 0.4 |
| 15 | 4B[2] | 9.7 ± 0.2 | 15.4 ± 0.4 | 18 ± 0.6 |
| 16 | 5 | 1.5 ± 0.2 | 2.6 ± 0.07 | 3.56 ± 0.05 |
| 17 | 6 | 1.5 ± 0.4 | 2.8 ± 0.3 | 0.1 ± 0.3 |
| 18 | 7 | 9.1 ± 0.003 | 0.15 ± 0.3 | 0.7 ± 0.4 |
| 19 | 8 | 0.45 ± 0.01 | 1.1 ± 0.1 | 2.0 ± 0.2 |
| Product in accordance with this application | | 12.70 ± 9.27 | 21.04 ± 1.32 | 14.16 ± 0.71 |

Example 9

Thermal Protection Provided by the Silica Gel Matrix

Figure 4:
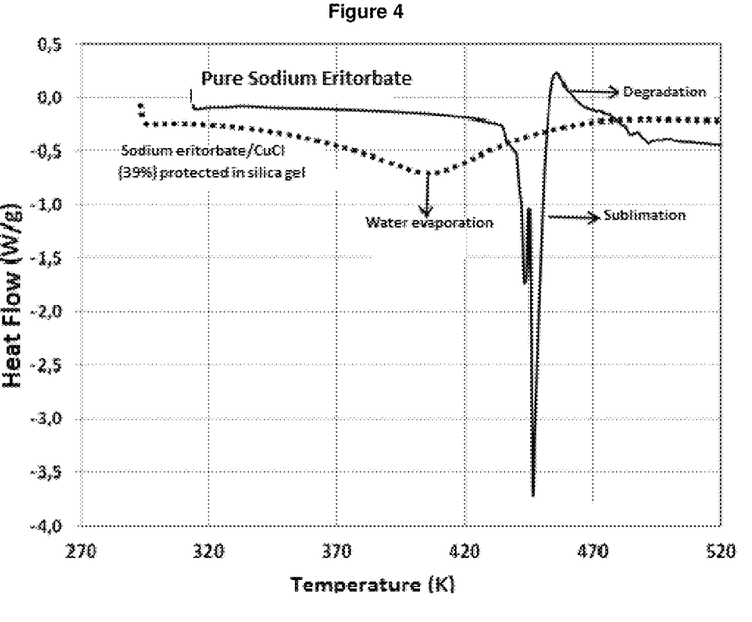
FIG. 4 presents the result for pure sodium erythorbate (continuous line), which shows a sublimation phenomenon from 423K, followed by a decomposition phenomenon between 448K and 453K. The result from the calorimetric test for a mixture 61/39 w/w of sodium erythorbate/cuprous chloride encapsulated in silica gel to the 50% in mass (discontinuous line).

Differential scanning calorimetry was done in a DSC Q200 TA Instruments at a heating speed of 5° C./minute from 293.15K up to 523.15K. FIG. 4 represents the result for a pure sodium erythorbate simple with a continuous line evidencing a sublimation phenomenon from 423K, followed by a decomposition phenomenon between 448K and 453K. The operation window of this compound would be necessarily below 423K. The dotted line represents the results of calorimetry for a 61/40 w/w simple of sodium erythorbate/cuprous chloride encapsulated in silica gel at 50% mass. The encapsulated sample shows an endothermic peak between 373K and 423K due to the evaporation of superficial water (Bednarek, J., & Schlick, S. (1991). Stability of Radical Intermediates in Microscopically Heterogeneous Media. Photolysis of Water Adsorbed on Silica Gel Studied by ESR and DSC. J. Phys. Chem, 9940-9944). In the analysis of the encapsulated mixture there were no fusion, sublimation or degradation phenomenons which the erythorbate of pure sodium suffers.

Example 10

Figure 5A:
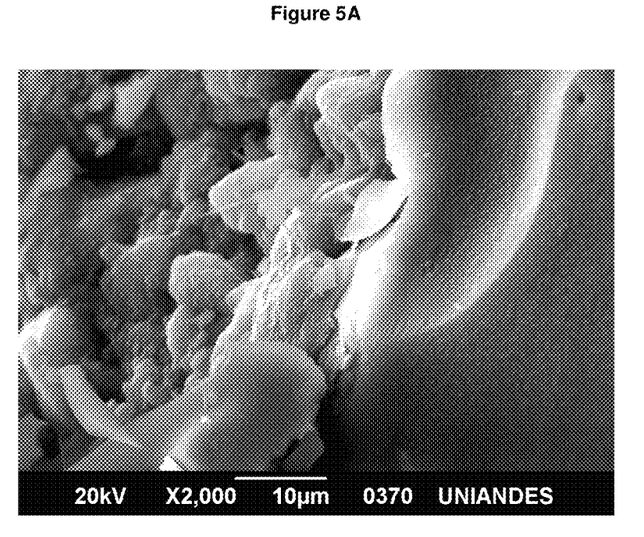
FIGS. 5A and 5B show the comparison between the electronic microscopies of pure silica gel sweeping (FIG. 5A) and a mixture of sodium erythorbate/cuprous chloride and a mixture of Sodium erythorbate/iron sulfate 39/61 w/w encapsulated to the 10% w/w in silica gel (FIG. 5B).
Figure 5B:
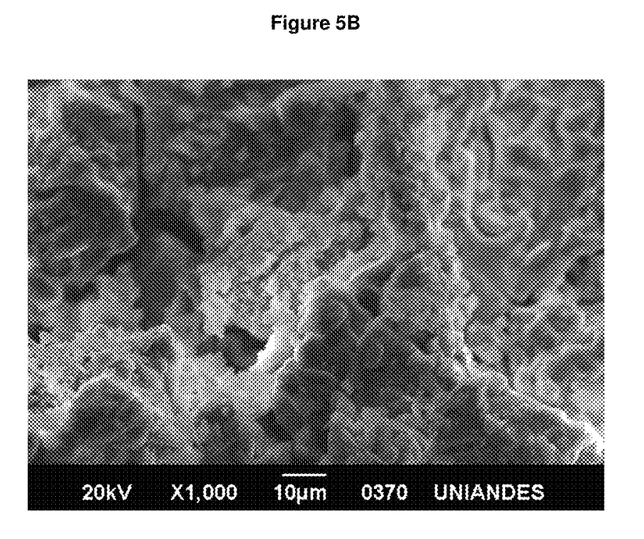

FIGS. 5A and 5B show the comparison between the scanning electronic microscopies of pure silica gel (FIG. 5A) and a mixture of cuprous Sodium/Chlorhyde Erythorbate and a mixture of Sodium Erythorbate/Iron Sulfate 39/61 w/w encapsulated to the 10% w/w in silica gel (FIG. 5B). The capsuled substance enters in the silica's pores and adheres to the surface.

What is claimed is:

1. A method of preparing an oxygen-absorbing composition, the method comprising:
   a) preparing a powdered mixture of an oxygen-absorbing substance and a catalyst having a non-organic salt of a transition metal;
   b) adding the powdered mixture to water to form a suspension of the oxygen-absorbing substance and the catalyst, the suspension having a concentration of between 67 and 133 g of the powdered mixture/liter of the water in the suspension;
   c) making an aqueous solution by adding hydrochloric acid to water in an amount to obtain a pH below about 1, and adding sodium silicate to the hydrochloric acid and water in an amount to obtain a pH of about 2 in the aqueous solution;
   d) adding the aqueous solution to the suspension;
   e) adding sodium silicate to the aqueous solution and the suspension under conditions in which the aqueous solution and suspension are being agitated at no greater than about 100 Hz to form a gel;
   f) resting the gel for a period of time between about 1 and 48 hours;
   g) washing the gel with water and substantially removing salts that result from the neutralization step; and
   h) drying the washed gel at temperatures between about 333.15° K and 363.15° K and at about atmospheric pressure or under vacuum and forming the oxygen-absorbing composition.

2. A method of preparing an oxygen scavenger comprising the steps of:
   a) preparing a mixture of an oxygen absorber and a catalyst, wherein the catalyst is an inorganic salt of a transition metal;
   b) making an aqueous solution by combining water, sodium silicate, and an acid in an amount sufficient to yield a solution having a pH below 2;
   c) adding the prepared mixture of the oxygen absorber and the catalyst to the aqueous solution;
   d) adding sodium silicate to the prepared mixture and the aqueous solution in an amount sufficient to produce a gel;
   e) washing the gel with water and substantially removing the salts that resulted in step b); and
   f) drying the washed gel and forming the oxygen scavenger.

3. The method of preparing an oxygen scavenger of claim 2 wherein the step of preparing a mixture of an oxygen absorber and a catalyst comprises preparing a solid mixture.

4. The method of preparing an oxygen scavenger of claim 2 wherein the step of preparing a mixture of an oxygen absorber and a catalyst comprises preparing a liquid solution.

5. The method of preparing an oxygen scavenger of claim 4 wherein the prepared liquid solution comprises the oxygen absorber and the catalyst at a concentration of between 67 and 133 g/liter.

6. The method of preparing an oxygen scavenger of claim 2 wherein the oxygen absorber comprises erythorbic acid or a salt thereof.

7. The method of preparing an oxygen scavenger of claim 2 wherein the step of making an aqueous solution comprises adding hydrochloric acid.

8. The method of preparing an oxygen scavenger of claim 7 wherein the step of making an aqueous solution comprises adding sodium silicate in a relation of 10 to 40 grams of sodium silicate solution per liter of hydrochloric acid.

9. The method of preparing an oxygen scavenger of claim 2 further comprising a step of resting the washed gel for about 1 and 48 hours and at a temperature between 283.15° K and 323° K.

10. The method of preparing an oxygen scavenger of claim 2 further comprising a step of:
   g) activating the oxygen scavenger by maintaining the oxygen scavenger at a temperature of between about 298.15° K and 353.15° K in a relative humidity of between about 50% and 99% or with actinic radiation, or a combination thereof, for a period of time of between about 1800 and 7200 seconds.

11. The method of preparing an oxygen scavenger of claim 2, wherein the step of preparing a mixture of an oxygen absorber and a catalyst is prepared to provide the oxygen scavenger with a concentration of the inorganic salt of a transition metal between 0.39 and 2 grams for each gram of the oxygen absorber.

12. The method of preparing an oxygen scavenger of claim 6, wherein the oxygen absorber comprises sodium erythorbate.

13. The method of preparing an oxygen scavenger of claim 2 further comprising the steps of:
   grinding the oxygen absorber;
   homogenizing the size of the oxygen absorber by a sieving to about 180 or less micrometers;
   incorporating the oxygen absorber into a polymer in a proportion of about 5% to 10% by weight of the polymer; and
   wherein the polymer incorporating the oxygen absorber is suitable for packaging.

14. The method of preparing an oxygen scavenger of claim 2 wherein the step of adding sodium silicate to the solution in an amount sufficient to produce a gel comprises agitating at no greater than about 100 Hz to form the gel.

* * * * *